United States Patent
Nakamura (10) Patent No.: US 10,654,491 B2
(45) Date of Patent: May 19, 2020

(54) WRONG-WAY-DRIVING SUPPRESSION DEVICE, WRONG-WAY-DRIVING SUPPRESSION METHOD, AND WRONG-WAY-DRIVING SUPPRESSION SYSTEM

(71) Applicant: Mitsubishi Electric Corporation, Tokyo (JP)

(72) Inventor: Shusuke Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/074,516

(22) PCT Filed: Mar. 1, 2016

(86) PCT No.: PCT/JP2016/056251
§ 371 (c)(1),
(2) Date: Aug. 1, 2018

(87) PCT Pub. No.: WO2017/149655
PCT Pub. Date: Sep. 8, 2017

(65) Prior Publication Data
US 2019/0031207 A1    Jan. 31, 2019

(51) Int. Cl.
*B60W 50/14*    (2020.01)
*G08G 1/16*    (2006.01)
(Continued)

(52) U.S. Cl.
CPC ............ *B60W 50/14* (2013.01); *B60W 40/10* (2013.01); *G01C 21/32* (2013.01); *G06F 16/29* (2019.01);
(Continued)

(58) Field of Classification Search
CPC combination set(s) only.
See application file for complete search history.

(56) References Cited

U.S. PATENT DOCUMENTS

2011/0121992 A1* 5/2011 Konaka ................ B62D 15/029
340/905
2013/0044009 A1* 2/2013 Tagawa .................. G08G 1/075
340/995.28
(Continued)

FOREIGN PATENT DOCUMENTS

JP    2003-151077 A    5/2003
JP    2009-252065 A    10/2009
(Continued)

OTHER PUBLICATIONS

International Search Report (PCT/ISA/210) issued in PCT/JP2016/056251, dated May 17, 2016.

*Primary Examiner* — An T Nguyen
(74) *Attorney, Agent, or Firm* — Birch, Stewart, Kolasch & Birch, LLP (57) ABSTRACT

Provided is a wrong-way-driving suppression device and the like for suppressing wrong-way-driving of a vehicle on a one-way road using existing map data and an onboard device or the like.

The wrong-way-driving suppression device according to the present invention includes: a current position acquiring unit for acquiring a current position of a host vehicle; a traveling direction acquiring unit for acquiring a traveling direction of the host vehicle; a map data acquiring unit for acquiring surrounding map data of the current position; a traveling status determination area setting unit for setting a determination area where a traveling status of the host vehicle is to be determined from the current position and the surrounding map data; a correct traveling direction storing unit for storing, as a correct traveling direction, a traveling direction of the host vehicle at the time of passing a connection point of an entrance-side connection road with a main line in the determination area, the entrance-side connection road connecting the main line and an entrance side of a rest facility;

(Continued)

and a notification instructing unit for instructing a notifier to perform predetermined notification when an angle formed by a traveling direction of the host vehicle and the correct traveling direction is larger than or equal to a first threshold value in the determination area.

6 Claims, 7 Drawing Sheets

(51) Int. Cl.
*G06F 16/9537* (2019.01)
*G06F 16/29* (2019.01)
*B60W 40/10* (2012.01)
*G01C 21/32* (2006.01)
*G01C 21/36* (2006.01)

(52) U.S. Cl.
CPC .......... *G06F 16/9537* (2019.01); *G08G 1/16* (2013.01); *G08G 1/166* (2013.01); *B60W 2050/143* (2013.01); *B60W 2520/06* (2013.01); *B60W 2550/22* (2013.01); *G01C 21/3697* (2013.01)

(56) References Cited

U.S. PATENT DOCUMENTS

| | | | | |
|---|---|---|---|---|
| 2018/0050693 | A1* | 2/2018 | Al-Deek | B60K 35/00 |
| 2018/0218599 | A1* | 8/2018 | Mauro | G08G 1/164 |
| 2018/0365989 | A1* | 12/2018 | Song | G08G 1/056 |
| 2019/0031207 | A1* | 1/2019 | Nakamura | G06F 16/29 |

FOREIGN PATENT DOCUMENTS

| | | |
|---|---|---|
| JP | 2009-258989 A | 11/2009 |
| JP | 2010-198585 A | 9/2010 |
| JP | 2011-100343 A | 5/2011 |
| JP | 2011-106960 A | 6/2011 |
| JP | 2011-146040 A | 7/2011 |
| JP | 2015-46201 A | 3/2015 |

\* cited by examiner

WRONG-WAY-DRIVING SUPPRESSION DEVICE, WRONG-WAY-DRIVING SUPPRESSION METHOD, AND WRONG-WAY-DRIVING SUPPRESSION SYSTEM

TECHNICAL FIELD

The present invention relates to, for example, a wrong-way-driving suppression device mounted on a vehicle, a wrong-way-driving suppression method, and a wrong-way-driving suppression system, and relates to a technique for suppressing wrong-way-driving using existing map data.

BACKGROUND ART

A road connecting a main line of a motor way or the like and a rest facility such as a service area or a parking area (including a facility with only a rest space without a building) (hereinafter referred to as "connection road") is one-way; however, it is assumed that a vehicle may accidentally travel in a wrong direction when returning from the rest facility to the main line. In response to this, proposed is an onboard device for storing one-way information of roads in rest facilities or connection roads, comparing a direction in which travel is permitted in a one-way road near the position of a host vehicle with a traveling direction of the host vehicle, and notifying by speech or the like when it is determined that the host vehicle is traveling in a wrong direction (Patent Literature 1).

Also proposed is a system for determining whether a vehicle is traveling in a wrong direction by transmitting identification information from a wireless transmitter installed on a road side at a boundary between a rest facility and a connection road and receiving the identification information by a wireless receiver mounted on the vehicle and, when determination is made that the vehicle is traveling in the wrong direction, performing notification by speech or the like (Patent Literature 2).

CITATION LIST

Patent Literatures

Patent Literature 1: JP 2011-106960 A (p. 14 and FIG. 2)
Patent Literature 2: JP 2003-151077 A (p. 17 and FIG. 1)

SUMMARY OF INVENTION

Technical Problem

In the conventional wrong-way-driving suppression device or the wrong-way-driving suppression system described above, it is necessary to store one-way information of roads in rest facilities or connection roads, and thus there is a problem that a storage capacity becomes large (the cost increases) (Patent Literature 1).

There is another problem that wireless communication devices are required on a road side and a vehicle side, thus resulting in a high cost (Patent Literature 2).

The present invention has been devised in order to solve the problems described above, and it is an object of the present invention to provide a wrong-way-driving suppression device, a wrong-way-driving suppression method, and a wrong-way-driving suppression system each for suppressing a vehicle from traveling in a wrong direction on a one-way road, especially traveling in a wrong direction on a connection road, by using existing map data and an onboard device (onboard apparatus).

Solution to Problem

A wrong-way-driving suppression device according to the present invention includes: a current position acquiring unit for acquiring a current position of a host vehicle; a traveling direction acquiring unit for acquiring a traveling direction of the host vehicle; a map data acquiring unit for acquiring surrounding map data of the current position; a wrong-way-driving determination area setting unit for setting an area where it is determined whether the host vehicle is traveling in a wrong direction from the current position and the surrounding map data; a correct traveling direction storing unit for storing, as a correct traveling direction, a traveling direction of the host vehicle at the time of passing an entrance of a connection road on an entrance side of a rest facility in the area; and a notification instructing unit for instructing a notifier to perform predetermined notification when an angle formed by a traveling direction of the host vehicle and the correct traveling direction is larger than or equal to a first threshold value in the area.

Advantageous Effects of Invention

A wrong-way-driving suppression device configured as described above has an effect of enabling suppression of wrong-way-driving of a vehicle at low cost by notifying that the vehicle is traveling in a wrong direction on a one-way road using existing map data and an onboard device.

DESCRIPTION OF EMBODIMENTS

Hereinafter, embodiments of the present invention will be described with reference to the drawings.

First Embodiment

A wrong-way-driving suppression device according to a first embodiment of the present invention will be described with reference to FIGS. 1, 2, 3, and 4.

Figure 1:
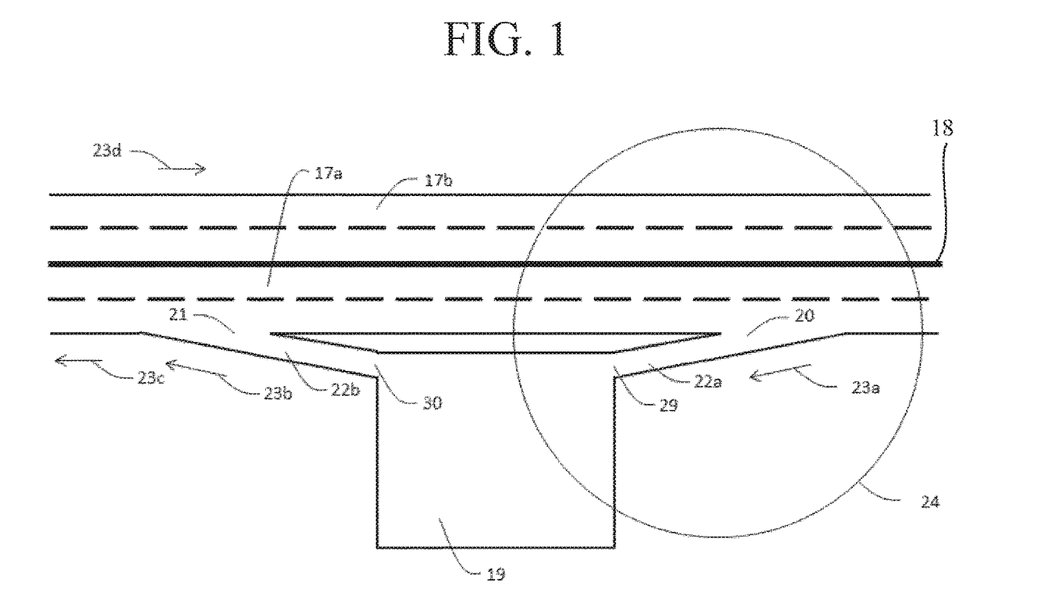
FIG. 1 is a diagram illustrating an example in which a wrong-way-driving suppression device of a first embodiment of the present invention notifies wrong-way-driving.

FIG. 1 is a diagram illustrating an example in which a wrong-way-driving suppression device of the first embodiment of the present invention notifies wrong-way-driving. A rest facility 19 such as a service area or a parking area is installed in a motor way or the like, and a vehicle travels on a connection road 22a along a one-way direction 23a in order to enter the rest facility 19 from a main line 17a. Similarly, in order to return from the rest facility 19 to the main line 17a, the vehicle travels on a connection road 22b along a one-way direction 23b. Since a vehicle traveling on the main line 17a usually travels at a high speed, the vehicle returning from the rest facility 19 to the main line 17a accelerates on the connection road 22b and then merges into the main line 17a. (Usually, traveling directions of a motor way or the like are separated from each other by a median strip 18, and thus a vehicle does not merge into the main line 17b after traveling on the connection road 22b. That is, a vehicle accelerates on the connection road 22b.) However, a driver may erroneously recognize the connection road 22a as the connection road 22b after an action such as taking a break at the rest facility 19, and drive on the connection road 22a at a high speed in the opposite direction to the one-way direction 23a, thus resulting in an accident. In order to suppress wrong-way-driving of a one-way road as described above, the wrong-way-driving suppression device according to the first embodiment of the present invention performs notification to a passenger on a host vehicle in the case of traveling in a wrong direction or a possibility of wrong-way-driving is increasing. Hereinafter, the operation of the wrong-way-driving suppression device of the first embodiment of the present invention will be described.

Figure 2:
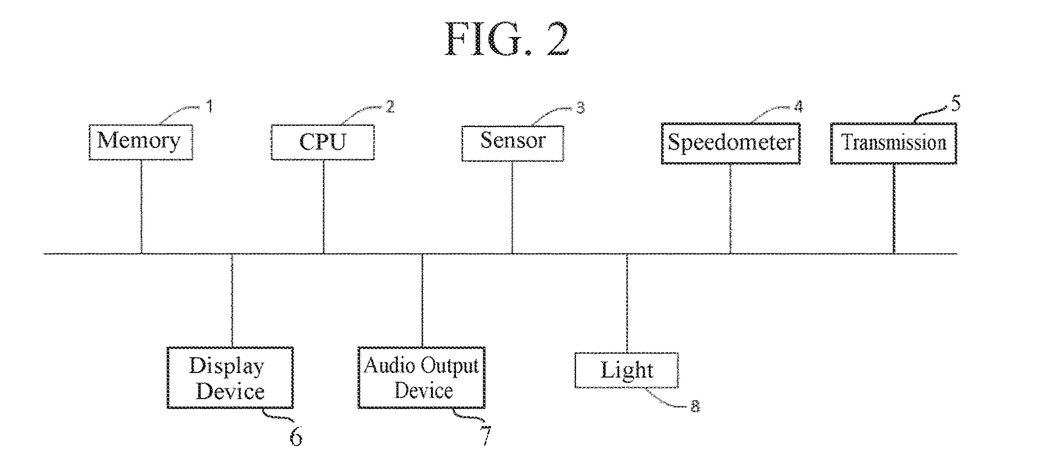
FIG. 2 is an example of an H/W configuration of an onboard apparatus including the wrong-way-driving suppression device of the first embodiment of the present invention.

FIG. 2 is an exemplary H/W configuration of an onboard apparatus including the wrong-way-driving suppression device according to the first embodiment of the present invention, and, as will be described later, a CPU 2 estimates whether the host vehicle is traveling in a wrong direction on the basis of various information acquired from a memory 1 or a sensor 3 and, when determining that it is necessary to notify of wrong-way-driving, instructs notification to a passenger of the host vehicle by a display device 6 or an audio output device 7.

Figure 3:
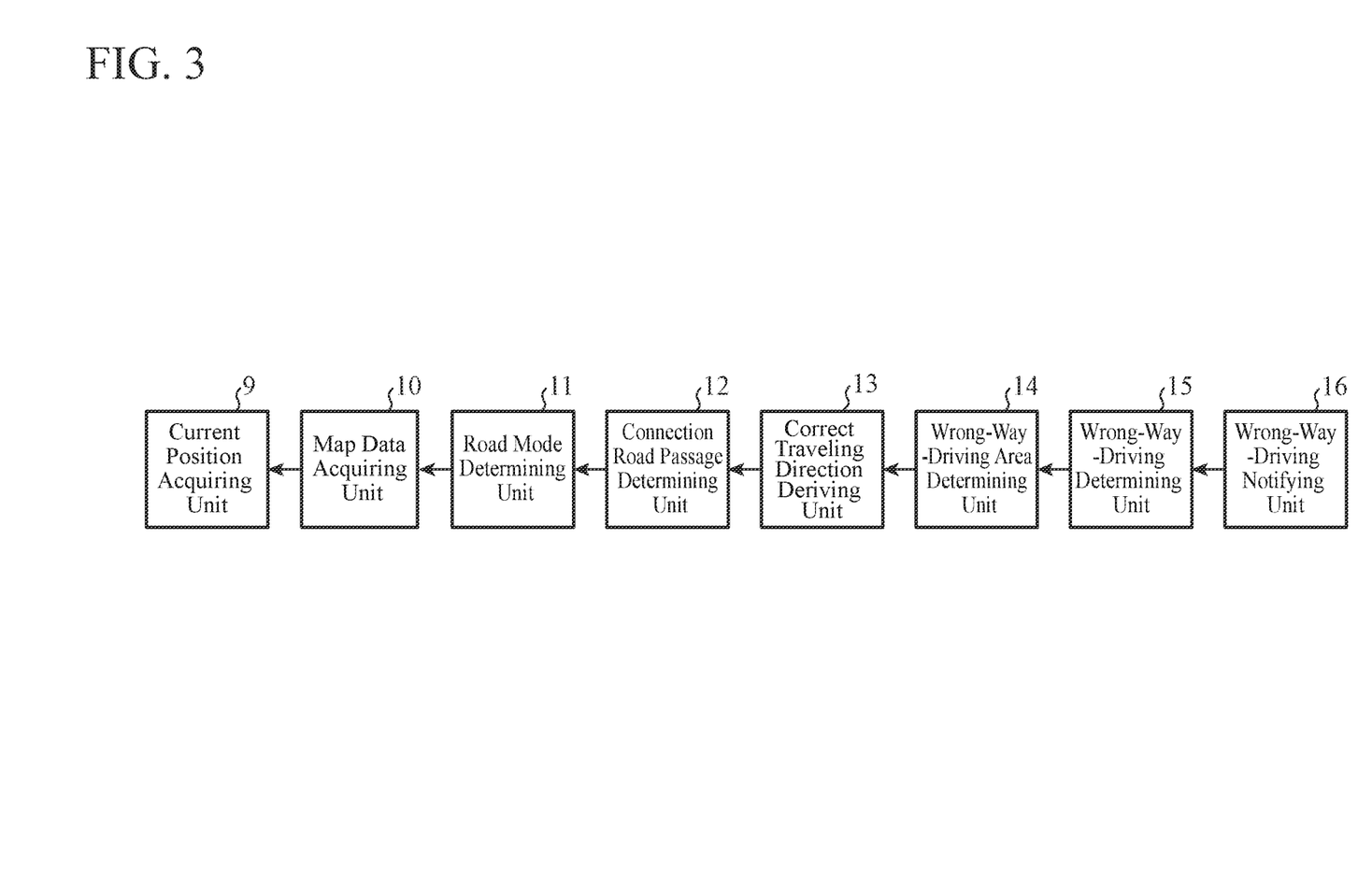
FIG. 3 is a block diagram illustrating the wrong-way-driving suppression device of the first embodiment of the present invention.

FIG. 3 is a block diagram illustrating the wrong-way-driving suppression device of the first embodiment of the present invention.

A current position acquiring unit 9 is implemented by the CPU 2. The CPU 2 estimates the current position of the host vehicle from information acquired from the sensor 3 such as a global positioning system (GPS) and a gyro sensor and outputs the current position to a map data acquiring unit 10.

The map data acquiring unit 10 is implemented by the CPU 2. The CPU 2 acquires map data around the current position of the host vehicle from the memory 1 and outputs the map data to a road mode determining unit 11 together with the current position of the host vehicle input from the current position acquiring unit 9.

The road mode determining unit 11 is implemented by the CPU 2. The CPU 2 determines whether the host vehicle is positioned on a motor way such as an expressway from the current position of the host vehicle and the map data around the current position input from the map data acquiring unit 10 (hereinafter referred to as "road mode determination result"), and outputs the result to a connection road passage determining unit 12 together with the current position of the host vehicle and the map data around the current position input from the map data acquiring unit 10.

The connection road passage determining unit 12 is implemented by the CPU 2. When the road mode determination result input from the road mode determining unit 11 shows that the host vehicle is positioned on a motor way, the CPU 2 determines whether the host vehicle has passed, is passing, or has not yet passed a connection road entrance 20 which is the entrance of the connection road 22a connecting the main line 17a and a rest facility entrance 29, from the current position of the host vehicle and the map data around the current position input from the road mode determining unit 11 (hereinafter referred to as "entrance passage determination result"), and outputs the result to a correct traveling direction deriving unit 13 together with the current position of the host vehicle and the map data around the current position input from the road mode determining unit 11. In the entrance passage determination result, for example when the host vehicle is positioned at the rest facility 19 or on the connection road 22, it is determined as "having passed", when the host vehicle is positioned at the connection road entrance 20, it is determined as being "passing", and when the host vehicle is positioned on the main line 17, it is determined as "not having passed." When the road mode determination result input from the road mode determining unit 11 shows that the host vehicle is not positioned on a motor way, it is determined in the entrance passage determination result as "not having passed", and the result is output to the correct traveling direction deriving unit 13 together with the current position of the host vehicle and the map data around the current position input from the road mode determining unit 11.

The correct traveling direction deriving unit 13 is implemented by the CPU 2. When the entrance passage determination result input from the connection road passage determining unit 12 is "passing", the CPU 2 sets a traveling direction of the host vehicle derived from the information acquired from the sensor 3 such as a gyro sensor as a correct traveling direction, and outputs the traveling direction to a wrong-way-driving area determining unit 14 together with the current position of the host vehicle, the map data around the current position, and the entrance passage determination result input from the connection road passage determining unit 12. When the entrance passage determination result input from the connection road passage determining unit 12 is "having passed", the correct traveling direction having been derived as above is output to the wrong-way-driving area determining unit 14 together with the current position of the host vehicle, the map data around the current position, and the entrance passage determination result input from the connection road passage determining unit 12. When the entrance passage determination result input from the connection road passage determining unit 12 is "not having passed", the correct traveling direction is set as a null value and output to the wrong-way-driving area determining unit 14 together with the current position of the host vehicle, the map data around the current position, and the entrance passage determination result input from the connection road passage determining unit 12.

The wrong-way-driving area determining unit 14 is implemented by the CPU 2. When the entrance passage determination result input from the correct traveling direction deriving unit 13 is "having passed" or is "passing," the CPU 2 determines whether the host vehicle is positioned within the area where wrong-way-driving determination is to be performed (hereinafter referred to as "wrong-way-driving determination area"), from the current position of the host vehicle and the map data around the current position input from the correct traveling direction deriving unit 13 (hereinafter referred to as "wrong-way-driving area determination result"), and outputs the result to a wrong-way-driving determining unit 15 together with the correct traveling direction input from the correct traveling direction deriving unit 13. When the entrance passage determination result input from the correct traveling direction deriving unit 13 is "not having passed", the wrong-way-driving area determination result is regarded as being outside the wrong-way-driving determination area 24 and output to the wrong-way-driving determining unit 15 together with the correct traveling direction input from the correct traveling direction deriving unit 13.

Here, a method of setting the wrong-way-driving determination area 24 will be described with reference to FIG. 1. The map data includes position information such as longitude and latitude information of the connection road entrance 20 and a connection road exit 21, and in the case where the entrance passage determination result is "having passed" or "passing", the map data around the current position input from the correct traveling direction deriving unit 13 includes position information of the connection road entrance 20 and the connection road exit 21. Thus, a distance L between the connection road entrance 20 and the connection road exit 21 can be calculated. Next, the inside of a circle having a radius of αL and centered at the connection road entrance 20 is set as the wrong-way-driving determination area 24. Where α<1, and more preferably α<0.5. This is due to the following reason.

As described above, when returning to the main line 17 after resting at the rest facility 19, a driver may drive in a wrong way on the connection road 22a on the connection road entrance 20 side by confusing the connection road entrance 20 side and the connection road exit 21 side. Moreover, although the vehicle travels at a low speed in the rest facility 19 but travels at a high speed on the connection road 22 for merging into the main line 17. In other words, as the vehicle approaches the connection road 22, the traveling speed tends to increase, and the risk due to wrong-way-driving is increased. Therefore, a sufficient effect can be obtained from notification of wrong-way-driving on the connection road entrance 20 side. That is, where α<0.5, wrong-way-driving determination is performed only on the connection road entrance 20 side.

Note that in the case where the map data includes position information of the rest facility entrance 29 and a rest facility exit 30, a distance between the rest facility entrance 29 and the rest facility exit 30 may be set as L, and the inside of a circle having a radius of αL and centered at the rest facility entrance 29 may be regarded as the wrong-way-driving determination area 24. In this case, a traveling direction at the time of passing the rest facility entrance 29 is set as the correct traveling direction.

The wrong-way-driving determining unit 15 is implemented by the CPU 2. When the wrong-way-driving area determination result input from the wrong-way-driving area determining unit 14 shows that the host vehicle is within the wrong-way-driving determination area 24, the CPU 2 determines whether the host vehicle is traveling in a wrong direction by comparing the correct traveling direction input from the wrong-way-driving area determining unit 14 and the traveling direction of the host vehicle derived from the information acquired from the sensor 3 (e.g. gyro sensor) (hereinafter referred to as a "wrong-way-driving determination result"), and outputs the result to the wrong-way-driving notifying unit 16. When the wrong-way-driving area determination result input from the wrong-way-driving area determining unit 14 shows that the host vehicle is outside the wrong-way-driving determination area 24, the wrong-way-driving determination result is obtained as correct-way-driving (not wrong-way-driving) and output to the wrong-way-driving notifying unit 16.

Here, a method of determining whether the host vehicle is traveling in a wrong direction from a correct traveling direction and a traveling direction of the host vehicle will be described. An angle θ (0°<θ<180°) formed by the correct traveling direction and the traveling direction of the host vehicle is derived, and if θ is larger than or equal to a predetermined angle, it is determined that the host vehicle is traveling in the wrong direction. It is sufficient that the predetermined angle is larger than or equal to 90 degrees. A smaller angle, as the predetermined angle, enables detecting the possibility of wrong-way-driving more quickly but may result in excessive detection, and a larger angle, as the predetermined angle, enables suppressing excessive detection but may result in a delay in timing of detecting the possibility of wrong-way-driving.

The wrong-way-driving notifying unit 16 is implemented by the CPU 2 and the audio output device 7. When the wrong-way-driving determination result input from the wrong-way-driving determining unit 15 shows wrong-way-driving, the CPU 2 instructs the audio output device 7 to notify a passenger of the host vehicle that the host vehicle is traveling in the wrong direction, and the audio output device 7 performs predetermined output. For example, a beep tone is output from a speaker, or speech such as "there is a possibility of wrong-way-driving" or "this is wrong-way-driving" is output. Here, although the audio output device 7 is used as a method of notifying the passenger of the host vehicle, the notification may be performed by display such as "there is a possibility of wrong-way-driving" or "this is wrong-way-driving" on the display device 6 such as a navigation screen or a head-up display, or the notification may be performed by both the audio output device 7 and the display device 6.

In the operation of each of the blocks described above, the current position of the host vehicle is delivered between the blocks; however, each of the blocks may acquire the current position from the sensor 3 or may acquire from a separate device such as a navigation device.

Figure 4:
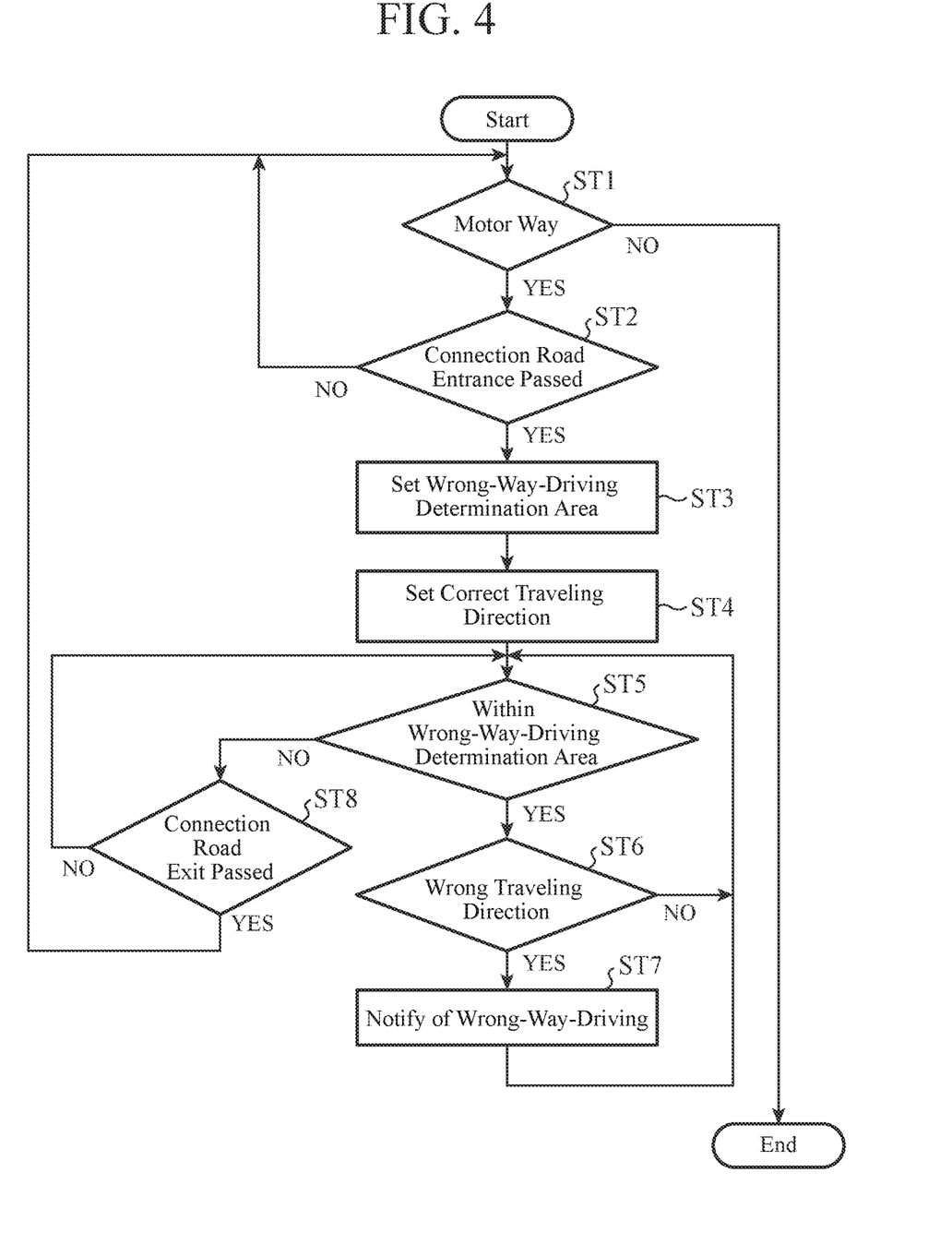
FIG. 4 is a flowchart illustrating the operation of the wrong-way-driving suppression device of the first embodiment of the present invention.

Next, the operation of the wrong-way-driving suppression device of the first embodiment will be described in detail using a flowchart. FIG. 4 is a flowchart illustrating the operation of the wrong-way-driving suppression device according to the first embodiment of the present invention.

In step ST1, it is determined whether the host vehicle is positioned on a motor way from the map data and the current position of the host vehicle, and if the host vehicle is positioned on a motor way, the processing proceeds to step ST2. If the host vehicle is not positioned on the motor way, the processing is terminated.

In step ST2, it is determined whether the host vehicle is positioned at the connection road entrance 20 from the map data and the current position of the host vehicle, and if the host vehicle is positioned at the connection road entrance 20, the processing proceeds to step ST3. If the host vehicle is not positioned at the connection road entrance 20, the processing proceeds to step ST1. Cases of proceeding to step ST1 include a case of not visiting the rest facility 19 at all and a case of having visited the rest facility 19 but back on the main line 17.

In step ST3, the wrong-way-driving determination area 24 is set from the map data. In step ST3, the host vehicle is positioned at the connection road entrance 20, and as described above about the operation of the wrong-way-driving area determining unit 14, the inside of the circle having a radius of αL and centered at the connection road entrance 20 is set as the wrong-way-driving determination area 24. The processing then proceeds to step ST4.

In step ST4, a correct traveling direction of a one-way road (in particular, the connection road 22a) is set using the information from the sensor 3 such as a gyro sensor. In step ST4, the host vehicle is positioned at the connection road entrance 20, and as described above about the operation of the correct traveling direction deriving unit 13, a traveling direction at the time of passing the connection road entrance 20 is set as the correct traveling direction. The processing then proceeds to step ST5.

In step ST5, it is determined whether the host vehicle is positioned within the wrong-way-driving determination area 24 from the wrong-way-driving determination area 24 set in step ST3 and the current position of the host vehicle, and if the host vehicle is positioned within the wrong-way-driving determination area 24, the processing proceeds to step ST6. If the host vehicle is not positioned in the wrong-way-driving determination area 24, the processing proceeds to step ST8.

In step ST6, it is determined whether the host vehicle is traveling on the one-way road in the wrong direction or whether the possibility of wrong-way-driving is increasing using the correct traveling direction set in step ST4 and the information from the sensor 3 such as a gyro sensor. As described above about the operation of the wrong-way-driving determining unit 15, in this determination if an angle formed by the correct traveling direction and the traveling direction of the host vehicle is larger than or equal to the predetermined angle, it is determined as wrong-way-driving or that the possibility of wrong-way-driving is increasing, and the processing proceeds to step ST7. If the predetermined angle is not reached, the processing proceeds to step ST5. The reason for proceeding to step ST5 is that it is necessary to suppress wrong-way-driving as long as the host vehicle is within the wrong-way-driving determination area 24. That is, steps ST5, ST6, and ST7 are repeated until the host vehicle moves to the outside of the wrong-way-driving determination area 24.

In step ST7, the fact of the wrong-way-driving or that the possibility of wrong-way-driving is increasing is notified to a passenger of the host vehicle by speech or screen display, and like in step ST6, since it is necessary to suppress wrong-way-driving as long as the host vehicle is within the wrong-way-driving determination area 24, the processing proceeds to step ST5. Since the traveling direction of the host vehicle changes as appropriate, if the host vehicle is traveling still within the wrong-way-driving determination area 24, the predetermined angle may not be reached in next processing in step ST6.

In step ST8, it is determined whether the host vehicle has passed the connection road exit 21 from the map data and the current position of the host vehicle, and if the host vehicle has passed the connection road exit 21 and is back on the main line 17, the processing proceeds to step ST1. If the host vehicle has not passed the connection road exit 21, there is a possibility that the host vehicle is traveling in the rest facility 19 toward the wrong-way-driving determination area 24, and thus the processing proceeds to step ST5.

As described above, the wrong-way-driving suppression device described in the first embodiment has an effect of enabling suppression of wrong-way-driving of a host vehicle at low cost, by notifying a passenger of the host vehicle that the host vehicle is traveling in a wrong direction on a one-way road, using existing map data and an onboard device.

In addition, since wrong-way-driving of the host vehicle on the one-way road is notified only within a predetermined distance from the connection road entrance 20, there is an effect that excessive notification is suppressed and thus troublesomeness that a passenger feels can be reduced.

Second Embodiment

A wrong-way-driving suppression device according to a second embodiment of the present invention will be described with reference to FIGS. 5 and 6. Note that, in FIGS. 5 and 6, the same symbols as those in FIGS. 3 and 4 indicate the same or corresponding parts. In the second embodiment, in addition to notifying a passenger of a host vehicle of wrong-way-driving of the host vehicle on a one-way road like in the first embodiment, when the possibility of occurrence of an accident caused by the wrong-way-driving further increases, warning is issued not only to the passenger of the host vehicle but also to passengers of surrounding vehicles. Hereinafter, the operation different from that of the first embodiment will be described.

Figure 5:
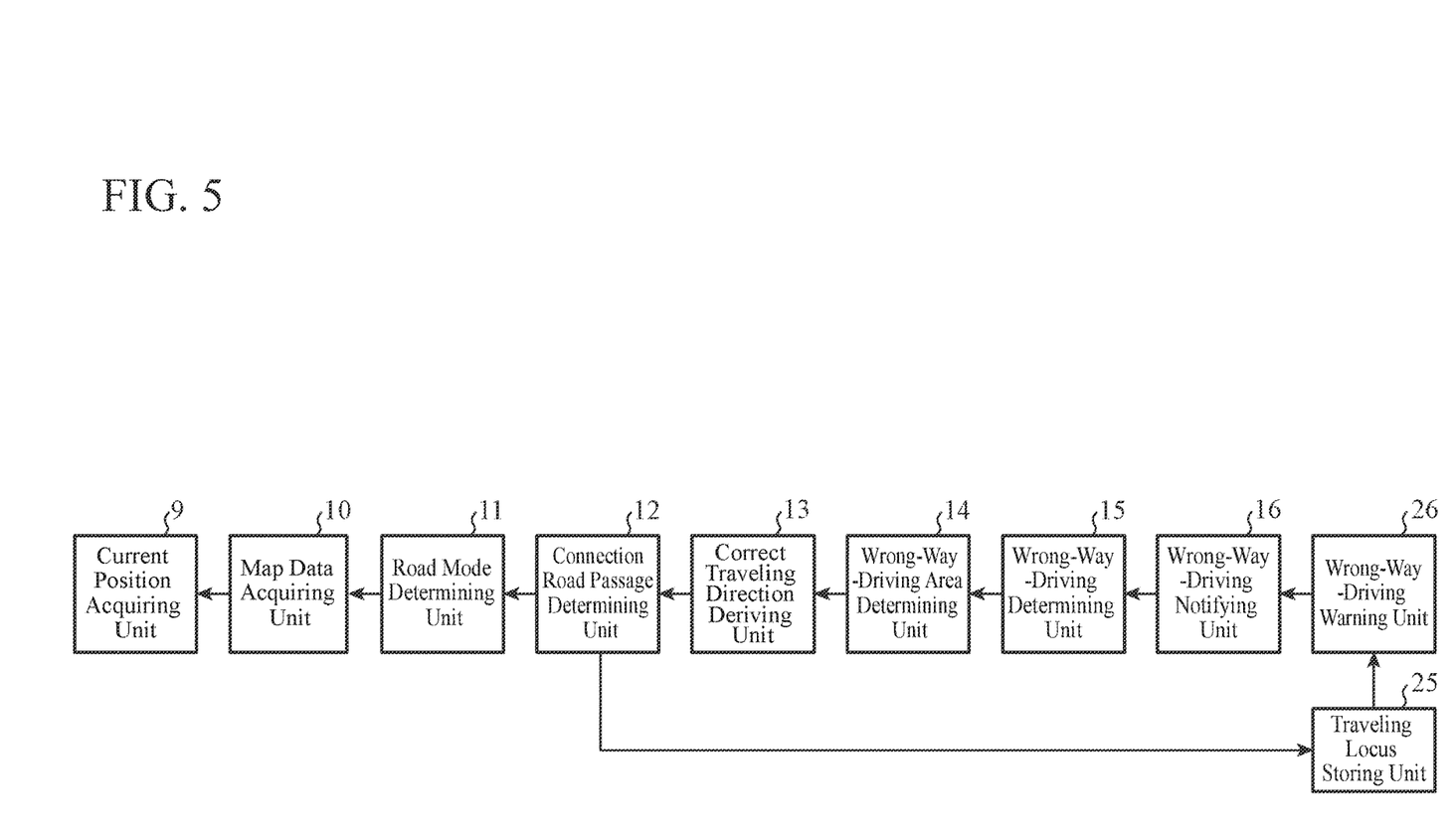
FIG. 5 is a block diagram illustrating a wrong-way-driving suppression device of a second embodiment of the present invention.
Figure 6:
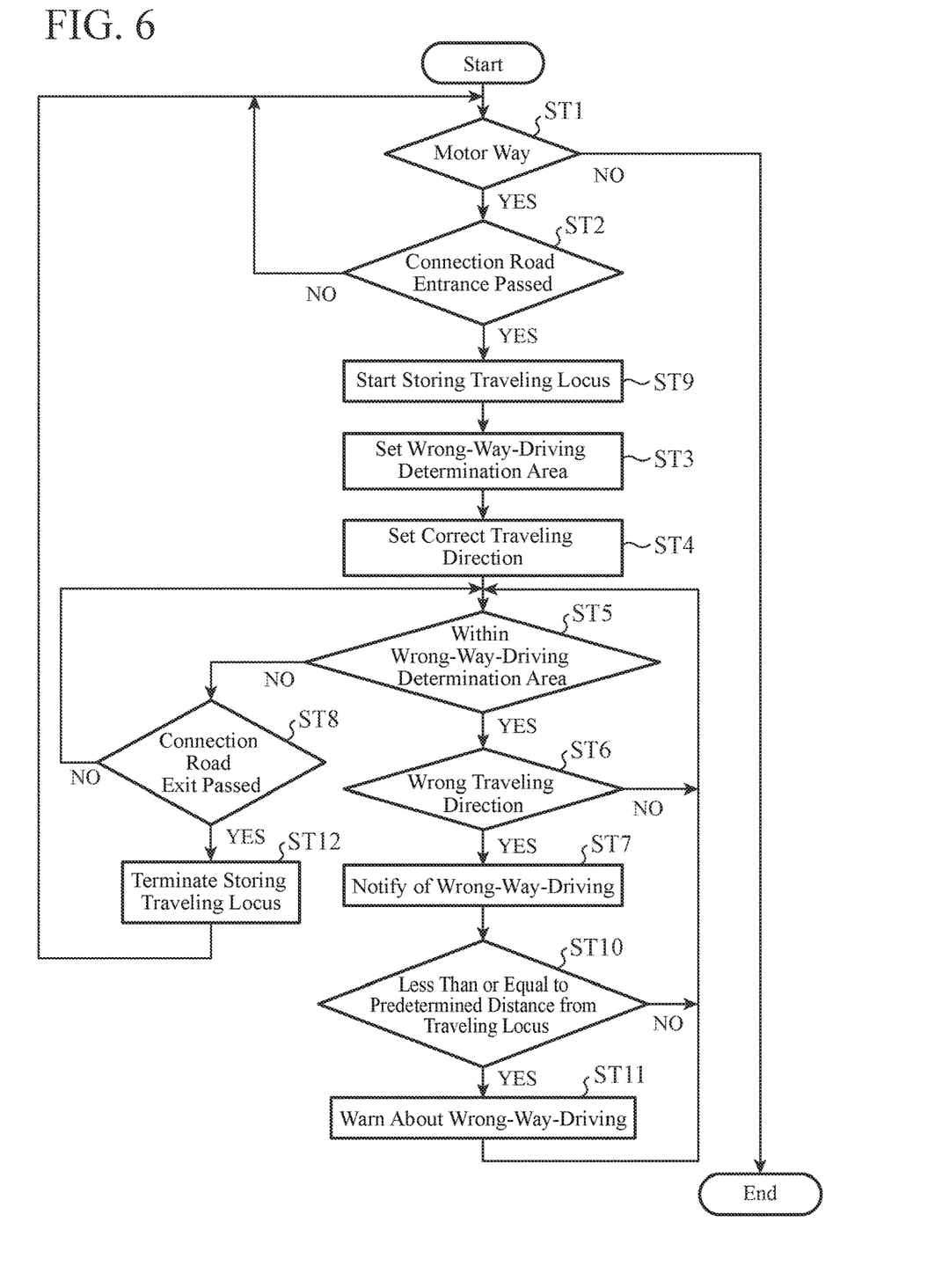
FIG. 6 is a flowchart illustrating the operation of the wrong-way-driving suppression device of the second embodiment of the present invention.

FIG. 5 is a block diagram illustrating the wrong-way-driving suppression device according to the second embodiment of the present invention. In the wrong-way-driving suppression device according to the second embodiment of the present invention, a traveling locus storing unit 25 and a wrong-way-driving warning unit 26 are added to the block diagram illustrating the wrong-way-driving suppression device according to the first embodiment of the present invention. In addition, the operations of a connection road passage determining unit 12, a wrong-way-driving area determining unit 14, a wrong-way-driving determining unit 15, and a wrong-way-driving notifying unit 16 are different. The operation of each of the blocks will be described below.

In addition to the operation of the wrong-way-driving suppression device according to the first embodiment of the present invention, the connection road passage determining unit 12 outputs the current position of the host vehicle and an entrance passage determination result to the traveling locus storing unit 25.

The traveling locus storing unit 25 is implemented by a CPU 2. When the entrance passage determination result input from the connection road passage determining unit 12 is "passing", the CPU 2 starts storing a traveling locus of the host vehicle in a memory 1 by using the current position of the host vehicle input from the connection road passage determining unit 12. When the entrance passage determination result input from the connection road passage determining unit 12 is "having passed", storing of the traveling locus of the host vehicle in the memory 1 is continued using the current position of the host vehicle input from the connection road passage determining unit 12. When the entrance passage determination result input from the connection road passage determining unit 12 is "not having passed", storing of the traveling locus of the host vehicle in the memory 1 is terminated.

In addition to the operation of the wrong-way-driving suppression device according to the first embodiment of the present invention, the wrong-way-driving area determining unit 14 outputs also the current position of the host vehicle input from the correct traveling direction deriving unit 13 to the wrong-way-driving determining unit 15.

In addition to the operation of the wrong-way-driving suppression device according to the first embodiment of the present invention, the wrong-way-driving determining unit 15 outputs also the current position of the host vehicle input from the wrong-way-driving area determining unit 14 to the wrong-way-driving notifying unit 16.

In addition to the operation of the wrong-way-driving suppression device according to the first embodiment of the present invention, the wrong-way-driving notifying unit 16 outputs the current position of the host vehicle and a wrong-way-driving determination result input from the wrong-way-driving determining unit 15 to the wrong-way-driving warning unit 26.

The wrong-way-driving warning unit 26 is implemented by the CPU 2 and the audio output device 7. When the wrong-way-driving determination result input from the wrong-way-driving notifying unit 16 shows wrong-way-driving and the shortest distance between the current position of the host vehicle input from the wrong-way-driving notifying unit 16 and the traveling locus of the host vehicle stored in the traveling locus storing unit 25 is equal to or less than a predetermined distance (e.g. 50 m), the CPU 2 instructs an audio output device 7 to warn a passenger of the host vehicle and passengers of surrounding vehicles about wrong-way-driving of the host vehicle, and the audio output device 7 performs predetermined output. For example, sounding the horn. Although here the audio output device 7 is used as a warning method, warning may be given by displaying a warning mark on a display device 6 such as a head-up display or an instrument panel or by highlighted display such as "there is a possibility of wrong-way-driving" or "this is wrong-way-driving." In addition, headlight flashing may be performed or a hazard lamp may be turned on by using a light 8.

In addition to the above, in the case where wrong-way-driving is continuing even though the wrong-way-driving warning unit 26 instructs to warn the wrong-way-driving, a traveling speed may be controlled to be automatically reduced to a predetermined traveling speed or may be controlled so as to completely stop. A condition for determining that wrong-way-driving is continuing may be, for example, that a traveling speed at the time of having traveled 100 meters from the time of instructing to warn the wrong-way-driving by the wrong-way-driving warning unit 26 is not less than a traveling speed at the time of instructing to warn the wrong-way-driving or that a traveling speed at the time when 5 seconds have passed after the time of instructing to warn the wrong-way-driving by the wrong-way-driving warning unit 26 is not less than a traveling speed at the time of instructing to warn the wrong-way-driving.

Next, the operation of the wrong-way-driving suppression device of the second embodiment will be described in detail using a flowchart. Note that only the operation different from the operation of the wrong-way-driving suppression device of the first embodiment will be described. FIG. 6 is a flowchart illustrating the operation of the wrong-way-driving suppression device of the second embodiment of the present invention.

In step ST9, the host vehicle is positioned at a connection road entrance 20, and storing of the current position of the host vehicle as a traveling locus is started. The processing then proceeds to step ST3. As described above about the operation of the traveling locus storing unit 25, the current position of the host vehicle may be input from the connection road passage determining unit 12, acquired from the sensor 3, or acquired by a navigation device.

In step ST12, the host vehicle is positioned on a main line 17, thus storing of the traveling locus is terminated. The processing then proceeds to step ST1. Note that, the traveling locus stored at this step may be reset in order to suppress a storage capacity of the memory 1, because storing of a traveling locus is started when the same or another connection road entrance 20 is passed again from the main line 17.

In step ST10, it is determined whether the shortest distance between the traveling locus started to be stored in step ST9 and the current position of the host vehicle is less than or equal to a predetermined distance. If the shortest distance is less than or equal to the predetermined distance, the processing proceeds to step ST11, and if the shortest distance is farther than the predetermined distance, the processing proceeds to step ST5. The reason for proceeding to step ST5 is that it is necessary to suppress wrong-way-driving as long as the host vehicle is within the wrong-way-driving determination area 24. That is, steps ST5, ST6, ST7, ST10, and ST11 are repeated until the host vehicle moves to the outside of the wrong-way-driving determination area 24.

In step ST11, the fact of the wrong-way-driving or that the possibility of wrong-way-driving is increasing is warned to a passenger of the host vehicle and passengers of surrounding vehicles by at least one of speech, screen display, and light emission, and like in step ST10, since it is necessary to suppress wrong-way-driving as long as the host vehicle is within the wrong-way-driving determination area 24, the processing proceeds to step ST5. Since a traveling direction of the host vehicle changes as appropriate, even when the host vehicle is still traveling in the wrong-way-driving determination area 24, there are cases where a predetermined angle is not reached in the next processing in step ST6 or the predetermined distance is exceeded in the next processing in step ST10 (the processing does not reach up to step ST11).

As described above, the wrong-way-driving suppression device described in the second embodiment has an effect of enabling suppression of wrong-way-driving of a host vehicle at low cost, by notifying or warning a passenger of the host vehicle that the host vehicle is traveling in a wrong direction on a one-way road, using existing map data and an onboard device.

In addition, there is an effect that it is possible to suppress an accident caused by wrong-way-driving of the host vehicle at low cost, by warning the passengers of the surrounding vehicles that the host vehicle is traveling in the wrong direction on the one-way road, using the existing map data and the onboard device.

In addition, since wrong-way-driving of the host vehicle on the one-way road is notified or warned only within a predetermined distance from the connection road entrance 20, there is effect that excessive notification or warning is suppressed and thus troublesomeness that a passenger feels can be reduced.

Third Embodiment

A wrong-way-driving suppression device according to a third embodiment of the present invention will be described with reference to FIG. 7. Note that, in FIG. 7, the same symbols as those in FIG. 3 indicate the same or corresponding parts. In the first embodiment, the fact that the host vehicle is traveling in a wrong direction on a one-way road is notified to a passenger of the host vehicle; however, it is assumed that the host vehicle temporarily travels in a wrong direction for parking, and receiving notification in such a situation makes the passenger feel annoyed. Therefore in the third embodiment, the operation is similar to that of the first embodiment; however, notification is not performed when a traveling speed of a host vehicle is equal to or less than a predetermined speed. Hereinafter, the operation different from that of the first embodiment will be described.

Figure 7:
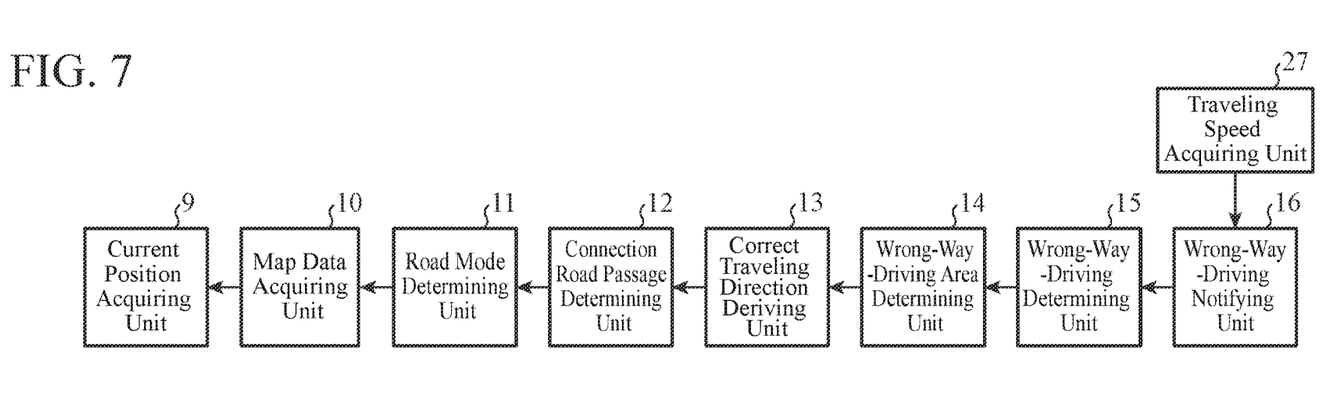
FIG. 7 is a block diagram illustrating a wrong-way-driving suppression device of a third embodiment of the present invention.

FIG. 7 is a block diagram illustrating a wrong-way-driving suppression device according to the third embodiment of the present invention. In the wrong-way-driving suppression device according to the third embodiment of the present invention, a traveling speed acquiring unit 27 is added to the block diagram illustrating the wrong-way-driving suppression device according to the first embodiment of the present invention. In addition, the operation of a wrong-way-driving notifying unit 16 is different. The operation of each of the blocks will be described below.

The traveling speed acquiring unit 27 is implemented by the CPU 2. The CPU 2 acquires the traveling speed of the host vehicle from a speedometer 4 and outputs the traveling speed to the wrong-way-driving notifying unit 16.

In the operation of the wrong-way-driving suppression device according to the first embodiment of the present invention, when the traveling speed of the host vehicle input from the traveling speed acquiring unit 27 is less than or equal to a predetermined speed (e.g. 10 km/h), even when a wrong-way-driving determination result input from a wrong-way-driving determining unit 15 shows wrong-way-driving, the wrong-way-driving notifying unit 16 does not instruct an audio output device 7 or other devices to notify the passenger of the host vehicle of the wrong-way-driving.

As described above, the wrong-way-driving suppression device described in the third embodiment has a similar effect to that of the wrong-way-driving suppression device of the first embodiment.

Furthermore, since wrong-way-driving of the host vehicle on the one-way road is not notified in the case of temporary wrong-way-driving for parking, there is an effect that troublesomeness that a passenger feels can be reduced.

Fourth Embodiment

A wrong-way-driving suppression device according to a fourth embodiment of the present invention will be described with reference to FIG. 8. Note that, in FIG. 8, the same symbols as those in FIG. 5 indicate the same or corresponding parts. In the second embodiment, the fact the host vehicle is traveling in a wrong direction on a one-way road is notified or warned to a passenger of the host vehicle; however, it is assumed that the host vehicle temporarily travels in a wrong direction for parking, and receiving notification or warning in such a situation makes the passenger feel annoyed. Therefore in the fourth embodiment, the operation is similar to that of the second embodiment; however, neither notification nor warning is not performed when a traveling speed of a host vehicle is equal to or less than a predetermined speed. Hereinafter, the operation different from that of the second embodiment will be described.

Figure 8:
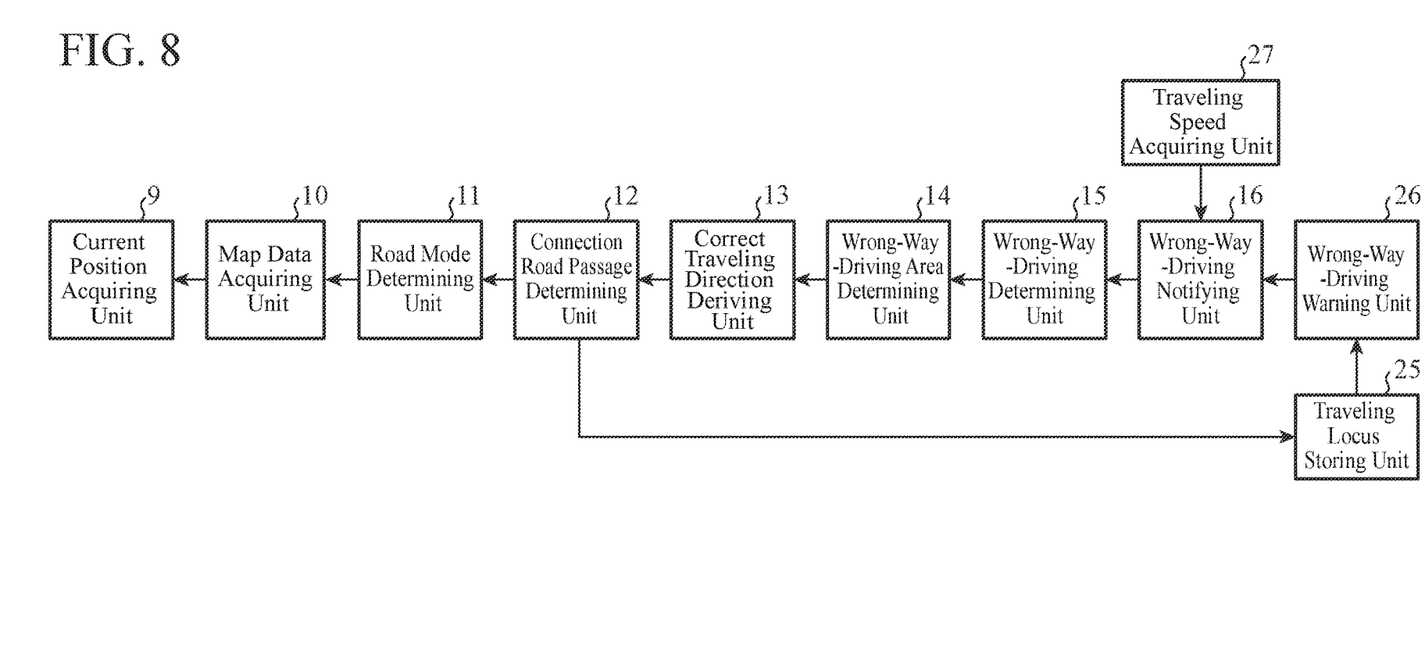
FIG. 8 is a block diagram illustrating a wrong-way-driving suppression device according to a fourth embodiment of the present invention.

FIG. 8 is a block diagram illustrating a wrong-way-driving suppression device according to the fourth embodiment of the present invention. In the wrong-way-driving suppression device according to the fourth embodiment of the present invention, a traveling speed acquiring unit 27 is added to the block diagram illustrating the wrong-way-driving suppression device according to the second embodiment of the present invention. In addition, the operations of a wrong-way-driving notifying unit 16 and a wrong-way-driving warning unit 26 are different. The operation of each of the blocks will be described below.

The traveling speed acquiring unit 27 is implemented by the CPU 2. The CPU 2 acquires the traveling speed of the host vehicle from a speedometer 4 and outputs the traveling speed to the wrong-way-driving notifying unit 16.

In the operation of the wrong-way-driving suppression device according to the second embodiment of the present invention, when the traveling speed of the host vehicle input from the traveling speed acquiring unit 27 is less than or equal to a predetermined speed (e.g. 10 km/h), even when a wrong-way-driving determination result input from a wrong-way-driving determining unit 15 shows wrong-way-driving, the wrong-way-driving notifying unit 16 does not instruct an audio output device 7 or other devices to notify the passenger of the host vehicle of the wrong-way-driving.

Moreover, the traveling speed of the host vehicle input from the traveling speed acquiring unit 27 is also output to the wrong-way-driving warning unit 26.

In the operation of the wrong-way-driving suppression device according to the second embodiment of the present invention, when the traveling speed of the host vehicle input from the wrong-way-driving notifying unit 16 is less than or equal to a predetermined speed (e.g. 20 km/h), even when a wrong-way-driving area determination result input from the wrong-way-driving notifying unit 16 shows that the host vehicle is within a wrong-way-driving determination area 24 and the shortest distance between the current position of the host vehicle input from the wrong-way-driving notifying unit 16 and a traveling locus of the host vehicle stored in the traveling locus storing unit 25 is less than or equal to a predetermined distance, the wrong-way-driving warning unit 26 does not instruct the audio output device 7 or other devices to warn a passenger of the host vehicle and passengers of surrounding vehicles about wrong-way-driving.

As described above, the wrong-way-driving suppression device described in the fourth embodiment has a similar effect to that of the wrong-way-driving suppression device of the second embodiment.

Furthermore, since wrong-way-driving of the host vehicle on the one-way road is not notified or warned in the case of temporary wrong-way-driving for parking, there is an effect that troublesomeness that a passenger feels can be reduced.

Fifth Embodiment

A wrong-way-driving suppression device according to a fifth embodiment of the present invention will be described with reference to FIG. 9. Note that, in FIG. 9, the same symbols as those in FIG. 3 indicate the same or corresponding parts. In the first embodiment, the fact the host vehicle is traveling in a wrong direction on a one-way road is notified to a passenger of the host vehicle; however, it is assumed that the host vehicle is oriented in a wrong direction while parked or stopped, and receiving notification in such a situation makes the passenger feel annoyed. Therefore in the fifth embodiment, the operation is similar to that of the first embodiment; however, notification is not performed when a transmission connection status of a host vehicle is in one of parking, neutral, and reverse. Hereinafter, the operation different from that of the first embodiment will be described.

Figure 9:
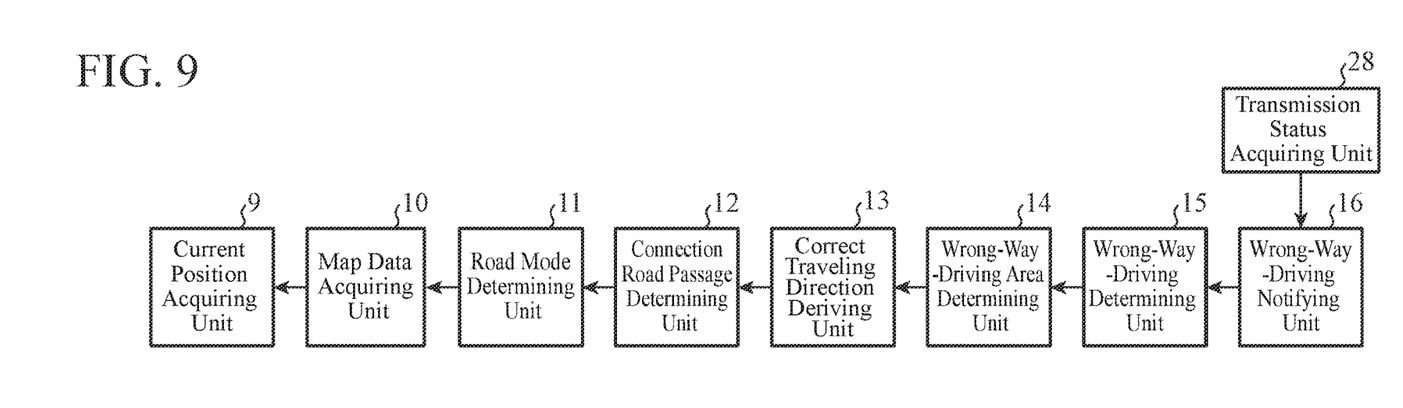
FIG. 9 is a block diagram illustrating a wrong-way-driving suppression device of a fifth embodiment of the present invention.

FIG. 9 is a block diagram illustrating a wrong-way-driving suppression device according to the fifth embodiment of the present invention. In the wrong-way-driving suppression device according to the fifth embodiment of the present invention, a transmission status acquiring unit 28 is added to the block diagram illustrating the wrong-way-driving suppression device according to the first embodiment of the present invention. In addition, the operation of a wrong-way-driving notifying unit 16 is different. The operation of each of the blocks will be described below.

The transmission status acquiring unit 28 is implemented by the CPU 2. The CPU 2 acquires a connection status of a transmission 5 and outputs the connection status to the wrong-way-driving notifying unit 16.

In the operation of the wrong-way-driving suppression device according to the first embodiment of the present invention, when the connection status of the transmission 5 input from the transmission status acquiring unit 28 is in one of parking, neutral, and reverse, even when a wrong-way-driving determination result input from a wrong-way-driving determining unit 15 shows wrong-way-driving, the wrong-way-driving notifying unit 16 does not instruct an audio output device 7 or other devices to notify the passenger of the host vehicle of the wrong-way-driving.

As described above, the wrong-way-driving suppression device described in the fifth embodiment has a similar effect to that of the wrong-way-driving suppression device of the first embodiment.

Furthermore, since wrong-way-driving of the host vehicle on the one-way road is not notified at the time of parking or stopping, there is an effect that troublesomeness that a passenger feels can be reduced.

Sixth Embodiment

A wrong-way-driving suppression device according to a sixth embodiment of the present invention will be described with reference to FIG. 10. Note that, in FIG. 10, the same symbols as those in FIG. 5 indicate the same or corresponding parts. In the second embodiment, the fact the host vehicle is traveling in a wrong direction on a one-way road is notified or warned to a passenger of the host vehicle; however, it is assumed that the host vehicle is oriented in a wrong direction while parked or stopped, and receiving notification or warning in such a situation makes the passenger feel annoyed. Therefore in the sixth embodiment, the operation is similar to that of the second embodiment; however, neither notification nor warning is performed when a transmission connection status of a host vehicle is one of parking, neutral, and reverse. Hereinafter, the operation different from that of the second embodiment will be described.

Figure 10:
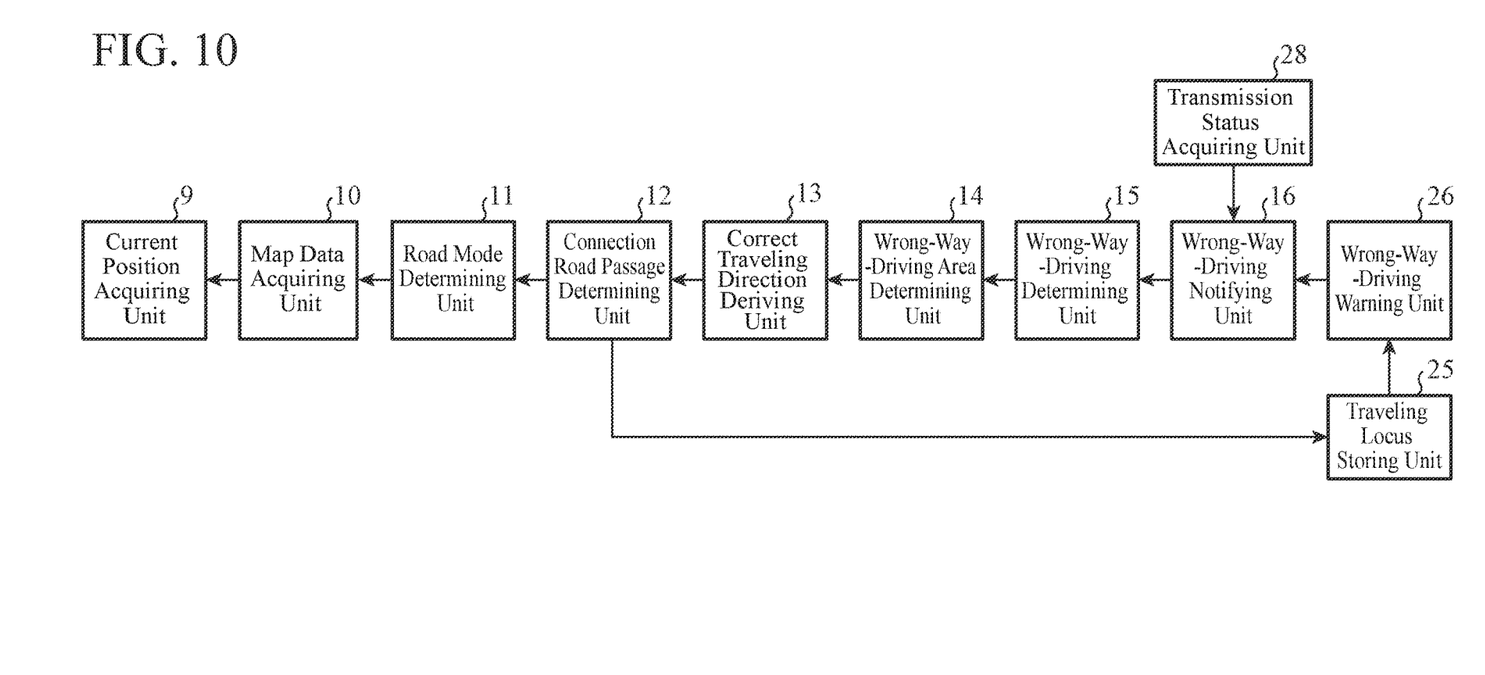
FIG. 10 is a block diagram illustrating a wrong-way-driving suppression device of a sixth embodiment of the present invention.

FIG. 10 is a block diagram illustrating a wrong-way-driving suppression device according to the sixth embodiment of the present invention. In the wrong-way-driving suppression device according to the sixth embodiment of the present invention, a transmission status acquiring unit 28 is added to the block diagram illustrating the wrong-way-driving suppression device according to the second embodiment of the present invention. In addition, the operations of a wrong-way-driving notifying unit 16 and a wrong-way-driving warning unit 26 are different. The operation of each of the blocks will be described below.

The transmission status acquiring unit 28 is implemented by the CPU 2. The CPU 2 acquires a connection status of a transmission 5 and outputs the connection status to the wrong-way-driving notifying unit 16.

In the operation of the wrong-way-driving suppression device according to the second embodiment of the present invention, when the connection status of the transmission 5 input from the transmission status acquiring unit 28 is in one of parking, neutral, and reverse, even when a wrong-way-driving determination result input from a wrong-way-driving determining unit 15 shows wrong-way-driving, the wrong-way-driving notifying unit 16 does not instruct an audio output device 7 or other devices to notify the passenger of the host vehicle of the wrong-way-driving.

Moreover, the connection status of the transmission 5 input from the transmission status acquiring unit 28 is also output to the wrong-way-driving warning unit 26.

In the operation of the wrong-way-driving suppression device according to the second embodiment of the present invention, when the connection status of the transmission 5 of the host vehicle input from the wrong-way-driving notifying unit 16 is in one of parking, neutral, and reverse, even when a wrong-way-driving area determination result input from the wrong-way-driving notifying unit 16 shows that the host vehicle is within a wrong-way-driving determination area 24 and the shortest distance between the current position of the host vehicle input from the wrong-way-driving notifying unit 16 and a traveling locus of the host vehicle stored in the traveling locus storing unit 25 is less than or equal to a predetermined distance, the wrong-way-driving warning unit 26 does not instruct the audio output device 7 or other devices to warn a passenger of the host vehicle and passengers of surrounding vehicles about wrong-way-driving.

As described above, the wrong-way-driving suppression device described in the sixth embodiment has a similar effect to that of the wrong-way-driving suppression device of the second embodiment.

Furthermore, since wrong-way-driving of the host vehicle on the one-way road is not notified or warned at the time of parking or stopping, there is an effect that troublesomeness that a passenger feels can be reduced.

Seventh Embodiment

The wrong-way-driving suppression device according to the first to the sixth embodiments of the present invention can be configured not only as an onboard device but also as a system by combining a portable navigation device (PND) that can be mounted in a vehicle, a portable communication terminal (for example, a mobile phone, a smartphone, and a tablet terminal), a server, and the like. In this case, the functions or the components of a wrong-way-driving suppression device are arranged while distributed as respective functions included in the system.

For example, some functions of the wrong-way-driving suppression device can be arranged in a smartphone and a server. A current position acquiring unit 9 estimates the current position of the host vehicle using a GPS installed in the smartphone brought inside the host vehicle and outputs the result to a map data acquiring unit 10. The map data acquiring unit acquires, by communication, map data around the current position of the host vehicle stored in the server and outputs the map data to a road mode determining unit 11.

As described above, the wrong-way-driving suppression system described in the seventh embodiment has a similar effect to those of the first to the sixth embodiments.

The wrong-way-driving suppression device, the wrong-way-driving suppression method, and the wrong-way-driving suppression system of the present invention have been described above on a motor way and the like; however, the present invention is not limited thereto. Moreover, a configuration of each of the units may be replaced with a desired configuration having a similar function.

REFERENCE SIGNS LIST

1: Memory, 2: CPU, 3: Sensor, 4: Speedometer, 5: Transmission, 6: Display device, 7: Audio output device, 8: Light, 9: Current position acquiring unit, 10: Map data acquiring unit, 11: Road mode determining unit, 12: Connection road passage determining unit, 13: Correct traveling direction deriving unit, 14: Wrong-way-driving area determining unit, 15: Wrong-way-driving determining unit, 16: Wrong-way-driving notifying unit, 17a, 17b: Main line, 18: Median strip, 19: Rest facility, 20: Connection road entrance, 21: Connection road exit, 22a, 22b: Connection road, 23a, 23b, 23c, 23d: One-way direction, 24: Wrong-way-driving determination area, 25: Traveling locus storing unit, 26: Wrong-way-driving warning unit, 27: Traveling speed acquiring unit, 28: Transmission status acquiring unit, 29: Rest facility entrance, 30: Rest facility exit.

The invention claimed is:

1. A wrong-way-driving suppression device, comprising:
a computer processor: and
a memory storing instructions which, when executed, cause the computer processor to perform a process including,
acquiring a current position of a host vehicle;
acquiring a traveling direction of the host vehicle;
acquiring surrounding map data of the current position;
setting a determination area where a traveling status of the host vehicle is to be determined from the current position and the surrounding map data;
determining, according to the acquired current position and the acquired surrounding map data, a time at which the host vehicle passes a connection point of an entrance-side connection road with a main line in the determination area, the entrance-side connection road connecting the main line and an entrance side of a rest facility;
designating the traveling direction of the host vehicle acquired at the determined time as a correct traveling direction for the determination area, and storing the correct traveling direction; and
instructing a notifier to perform predetermined notification when an angle formed by a traveling direction of the host vehicle and the correct traveling direction is larger than or equal to a first threshold value in the determination area, wherein
the process further includes
starting storing of a traveling locus of the host vehicle when the host vehicle passes the connection point of the entrance-side connection road with the main line; and
instructing a warning device to perform predetermined warning, when, in the determination area, the angle formed by the traveling direction of the host vehicle and the correct traveling direction is larger than or equal to the first threshold value and a distance between the current position and the stored traveling locus is less than or equal to a second threshold value.

2. The wrong-way-driving suppression device according to claim 1,
wherein the process discards the traveling locus from storage when the connection point of the exit-side connection road with the main line has been passed.

3. The wrong-way-driving suppression device according to claim 1, the process further comprising:
acquiring a traveling speed of the host vehicle,
wherein the process does not instruct to perform the predetermined warning when the traveling speed is less than or equal to a third threshold value.

4. The wrong-way-driving suppression device according to claim 1, the process further comprising:
acquiring a transmission connection status of the host vehicle,
wherein the process does not instruct to perform the predetermined warning when the transmission connection status is in one of parking, neutral, and reverse.

5. A wrong-way-driving suppression system for instructing a notifier to notify that a host vehicle is traveling in a wrong direction, the system comprising:
a computer processor; and
a memory storing instructions which, when executed, cause the computer processor to perform a process including,
setting a determination area where a traveling status of the host vehicle is to be determined from a current position of the host vehicle and surrounding map data of the current position;
determining, according to the current position of the host vehicle and the surrounding map data, a time at which the host vehicle passes a connection point of an entrance-side connection road with a main line in the determination area, the entrance-side connection road connecting the main line and an entrance side of a rest facility;
designating a detected traveling direction of the host vehicle at the determined time as a correct traveling direction for the determination area, and storing the correct traveling direction; and
instructing a notifier to perform predetermined notification when an angle formed by a traveling direction of the host vehicle and the correct traveling direction is larger than or equal to a first threshold value in the determination area, wherein
the process further includes
starting storing of a traveling locus of the host vehicle when the host vehicle passes the connection point of the entrance-side connection road with the main line; and
instructing a warning device to perform predetermined warning, when, in the determination area, the angle formed by the traveling direction of the host vehicle and the correct traveling direction is larger than or equal to the first threshold value and a distance between the current position and the stored traveling locus is less than or equal to a second threshold value.

6. A wrong-way-driving suppression method, comprising:
(a) setting a determination area where a traveling status of a host vehicle is to be determined from a current position of the host vehicle and surrounding map data of the current position;
(b) determining, according to the current position of the host vehicle and the surrounding map data, a time at which the host vehicle passes a connection point of an entrance-side connection road with a main line in the determination area, the entrance-side connection road connecting the main line and an entrance side of a rest facility;
(c) designating a detected traveling direction of the host vehicle at the determined time as a correct traveling direction for the determination area, and storing the correct traveling direction; and (d) instructing a notifier to perform predetermined notification when an angle formed by a traveling direction of the host vehicle and the correct traveling direction is larger than or equal to a first threshold value in the determination area, wherein the method further includes starting storing of a traveling locus of the host vehicle when the host vehicle passes the connection point of the entrance-side connection road with the main line; and instructing a warning device to perform predetermined warning, when, in the determination area, the angle formed by the traveling direction of the host vehicle and the correct traveling direction is larger than or equal to the first threshold value and a distance between the current position and the stored traveling locus is less than or equal to a second threshold value.

* * * * *